(12) United States Patent
Wang

(10) Patent No.: US 11,002,240 B2
(45) Date of Patent: May 11, 2021

(54) CAPACITIVE CAR JUMP STARTER

(71) Applicant: Yuhua Wang, Beijing (CN)

(72) Inventor: Yuhua Wang, Beijing (CN)

(*) Notice: Subject to any disclaimer, the term of this patent is extended or adjusted under 35 U.S.C. 154(b) by 0 days.

(21) Appl. No.: 16/605,278

(22) PCT Filed: Apr. 13, 2018

(86) PCT No.: PCT/CN2018/082958
§ 371 (c)(1),
(2) Date: Oct. 15, 2019

(87) PCT Pub. No.: WO2018/192420
PCT Pub. Date: Oct. 25, 2018

(65) Prior Publication Data
US 2020/0124014 A1    Apr. 23, 2020

(30) Foreign Application Priority Data

Apr. 17, 2017  (CN) .......................... 201720398053.2

(51) Int. Cl.
| F02N 11/14 | (2006.01) |
| H02J 1/10 | (2006.01) |
| F02N 11/08 | (2006.01) |
| H02J 7/34 | (2006.01) |
| H02J 7/35 | (2006.01) |

(52) U.S. Cl.
CPC .......... *F02N 11/14* (2013.01); *F02N 11/0862* (2013.01); *H02J 1/122* (2020.01); *H02J 7/345* (2013.01); *H02J 7/35* (2013.01)

(58) Field of Classification Search
CPC ........ F02N 11/0862; F02N 11/14; H02J 1/122
See application file for complete search history.

(56) References Cited

U.S. PATENT DOCUMENTS

| 2002/0041174 A1* | 4/2002 | Purkey ................ H01M 6/5033 |
| | | 320/103 |
| 2007/0285049 A1* | 12/2007 | Krieger .................... H02J 7/00 |
| | | 320/105 |
| 2011/0049979 A1* | 3/2011 | Yen .......................... H02J 7/00 |
| | | 307/10.1 |

(Continued)

FOREIGN PATENT DOCUMENTS

| CN | 201594767 U | 9/2010 |
| CN | 203387214 U | 1/2014 |

(Continued)

*Primary Examiner* — George C Jin
(74) *Attorney, Agent, or Firm* — The Webb Law Firm

(57) ABSTRACT

Disclosed is a capacitive car jump starter. The capacitive car jump starter includes a storage capacitor configured to store electrical energy to start an engine of a motorcar, a standby power supply device configured to input electrical energy to the storage capacitor, a test and indication device configured to test and indicate a power storage condition of the storage capacitor, and a control and protection device configured to control and protect an operation of a connection circuit from overload when the storage capacitor discharges to start the engine of the motorcar. The standby power supply device and the control and protection device are electrically connected to the storage capacitor, and the test and indication device is electrically connected to the control and protection device.

8 Claims, 2 Drawing Sheets

(56) References Cited

U.S. PATENT DOCUMENTS

| | | | |
|---|---|---|---|
| 2012/0200250 A1 | 8/2012 | Rastegar | |
| 2015/0102781 A1* | 4/2015 | Inskeep | H02J 7/345 |
| | | | 320/166 |
| 2015/0306965 A1* | 10/2015 | Bader | F02N 11/12 |
| | | | 320/105 |
| 2016/0072323 A1* | 3/2016 | Miller | H02J 7/342 |
| | | | 320/105 |
| 2017/0163066 A1* | 6/2017 | Inskeep | B60L 50/40 |
| 2017/0310153 A1* | 10/2017 | Inskeep | H02J 7/345 |
| 2020/0052517 A1* | 2/2020 | Rosso | H01M 2/1072 |
| 2020/0072177 A1* | 3/2020 | Clarke | F02N 11/0862 |

FOREIGN PATENT DOCUMENTS

| | | |
|---|---|---|
| CN | 105644378 A | 6/2016 |
| CN | 205882793 U | 1/2017 |
| CN | 206664505 U | 11/2017 |

\* cited by examiner

CAPACITIVE CAR JUMP STARTER

CROSS-REFERENCE TO RELATED APPLICATIONS

This application is the United States national phase of International Application No. PCT/CN2018/082958 filed Apr. 13, 2018, and claims priority to Chinese Patent Application No. 201720398053.2 filed Apr. 17, 2017, the disclosures of which are hereby incorporated by reference in their entirety.

TECHNICAL FIELD

The present disclosure relates to a device for jump-starting a motorcar, and the device uses a capacitor as an element for storing and supplying electricity.

BACKGROUND

When starting a motorcar, a common failure is that the motorcar can not be started due to an insufficient capacity of a storage battery. Methods that use a hand-held lithium battery (commonly referred to as a "Charge Pal" or a "Power Bank") to jump-start a motorcar have been known. However, it is not safe to directly start an engine of the motorcar using a Charge Pal due to a overlarge electrical current generated; and if the motorcar is started after the storage battery is charged by the Charge Pal, a long-time wait would be required and it would not necessarily be effective.

SUMMARY

The purpose of the present disclosure is to overcome deficiencies of the prior art and provide a capacitive car jump starter comprising: a storage capacitor that stores electrical energy for starting an engine of a motorcar; a standby power supply device that inputs electrical energy to the storage capacitor; a test and indication device that tests and indicates a power storage state of the storage capacitor; and a control and protection device that controls and protects an operation of a connection circuit from overload when the storage capacitor discharges to start the engine of the motorcar, wherein the standby power supply device and the control and protection device are electrically connected to the storage capacitor, and the test and indication device is electrically connected to the control and protection device.

The capacitive car jump starter provided by the present disclosure and the implementations thereof have a variety of options, and the use thereof is safer and more convenient. In addition, the capacitive car jump starter of the present disclosure is capable of visually indicating the power storage state of the capacitor and can actively protect the connection circuit from overload.

DETAILED DESCRIPTION

The implementations of the capacitive car jump starter of the present disclosure are illustrated by the embodiments set forth below in connection with the drawings.

The capacitive car jump starter of the present disclosure comprises: a storage capacitor that stores electrical energy for starting an engine of a motorcar; a standby power supply device that inputs electrical energy to the storage capacitor; a test and indication device that tests and indicates a power storage state of the storage capacitor; and a control and protection device that controls and protects an operation of a connection circuit from overload when the storage capacitor discharges to start the engine of the motorcar, wherein the standby power supply device and the control and protection device are electrically connected to the storage capacitor, and the test and indication device is electrically connected to the control and protection device.

Embodiment 1

Figure 1:
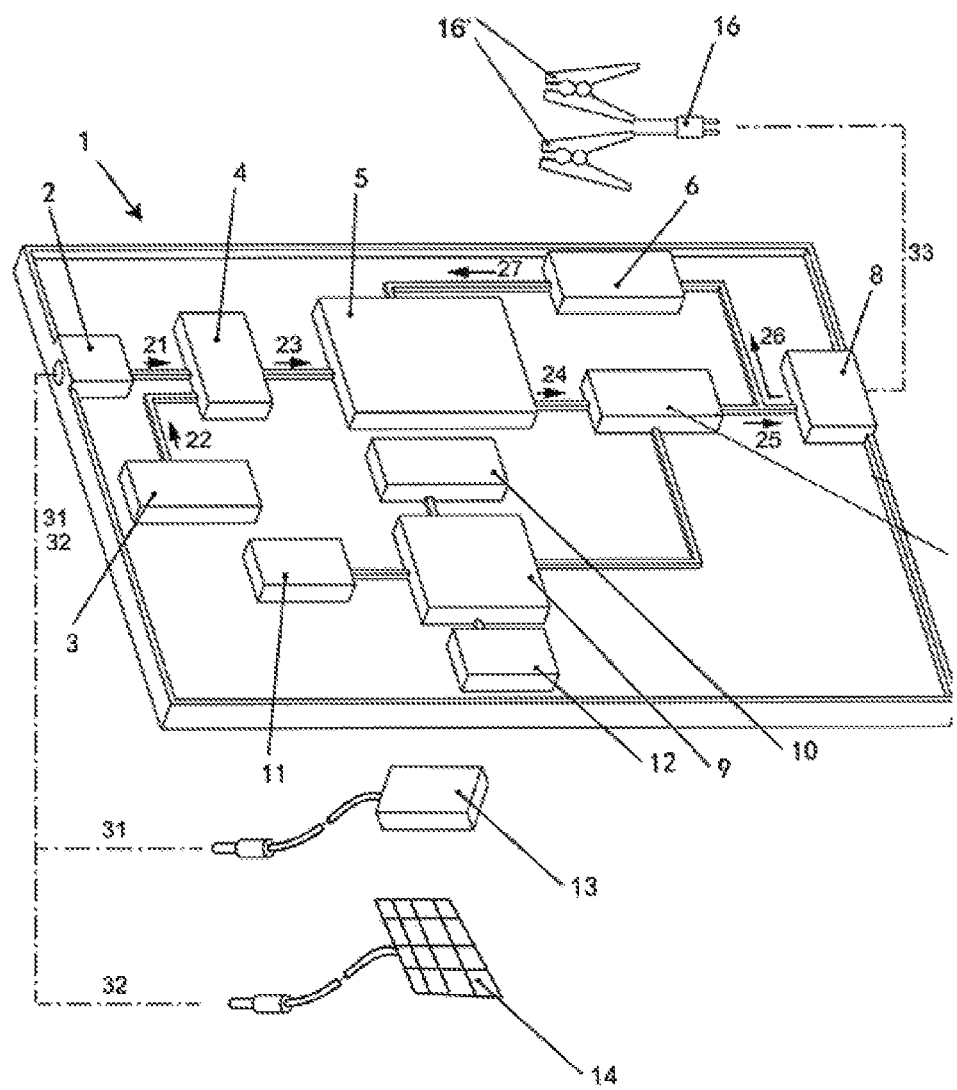
FIG. 1 is an overall schematic diagram of Embodiments 1 to 4 of the capacitive car jump starter of the present disclosure.

FIG. 1 is referred to. An ordinary portable power source (such as a Charge Pal type storage battery) or a car mounted 5V DC power source 13 as a standby power supply device is connected to an input socket 2 through a plug, and the power source is boosted to 12V DC by a charging circuit 4 as a boosting device to charge a storage capacitor 5 (such as the so-called supercapacitor). A storage capacity of the storage capacitor 5 arrives at a level enough to be charged by 5V DC/2 A for about 20 minutes. After charging of the storage capacitor 5 is completed, a capacity and charge and discharge indication device 10 as a test and indication device indicates completion of the charging to a user by means of light, and thus the motorcar can be started by a discharge protection circuit 7 (e.g., with a specification of 12V DC/200 A) as a control and protection device. An available start time (i.e. a discharge time of the capacitor) is normally about 2 to 3 seconds.

Embodiment 2

FIG. 1 is still referred to. Six AA (double A) 1.5V dry batteries that are used as a standby power supply device, one row of three of which are connected in series is connected in parallel to the other row of three of which are connected in series, with a total capacity up to about 4.5V DC, are placed in a battery box 3. These batteries are boosted to 12V DC through a charging circuit 4 as a boosting device to charge the storage capacitor 5. A storage capacity of the storage capacitor 5 arrives at a level enough to be charged by 5V DC/2 A for about 20 minutes. After charging of the storage capacitor 5 is completed, a capacity and charge and discharge indication device 10 as a test and indication device indicates completion of the charging to a user by means of light, and thus the motorcar can be started by a discharge protection circuit 7 as a control and protection device. An available start time (i.e. a discharge time of the capacitor) is normally about 2 to 3 seconds. The battery holder 3, the charging circuit 4, the storage capacitor 5, the discharge protection circuit 7 and the capacity and charge and discharge indication device 10 of this embodiment are provided within a cabinet 1 of the capacitive car jump starter.

Embodiment 3

FIG. 1 is still referred to. When a residual capacity of a storage battery of the motorcar is insufficient and the voltage thereof is low and unable to start the motorcar, remaining electrical energy of the storage battery of the motorcar will be used as the standby power supply device to charge the storage capacitor 5. Specifically, the operation will be performed like this: a connector clip 16' is clamped onto positive and negative electrodes of the storage battery of the motorcar, a preset charging button is pressed, and thus a charging circuit 6 (e.g., with a specification of 12V DC/6 A) starts to work, then the residual capacity in the storage battery of the motorcar is utilized to charge the storage capacitor 5 after being boosted by the charging circuit 6 as a boosting device. A storage capacity of the storage capacitor 5 arrives at a level enough to be charged at a preset electrical current of e.g., 5-10 A for about 1 to 2 minutes. After the storage capacitor 5 is charged to be full, a buzzer 11 and a charge and discharge indication device 10 that serve as a test and indication device make a sound and emit light to indicate that the motorcar is startable. At this time, the charging circuit 6 is turned off, the discharge protection circuit 7 as a control and protection device may start to work, and a user can start the motorcar. An available start time (i.e. a discharge time of the capacitor) is normally about 2 to 3 seconds. As shown in FIG. 1, the discharge protection circuit 7 is electrically connected to a MCU (micro control unit) intelligent control device 9, and the MCU intelligent control device 9 is in turn electrically connected to the charge and discharge indication device 10, the buzzer 11 and a key (button) circuit 12 respectively.

Embodiment 4

FIG. 1 is still referred to. The capacitive car jump starter is placed in a glove box (a storage case) or a trunk of a motorcar, and a small piece of solar cell panel 14 is attached to a proper position of a window of the motorcar. The solar cell panel is connected to an input socket 2 through a plug in a frequent and continuous manner, and then is boosted via a charging circuit 4 as a boosting device to charge the storage capacitor 5. The electrical energy to be consumed by the capacitor per se is frequently and continuously supplemented such that the storage capacitor 5 is always in a state of being substantially full. Thus the capacitive car jump starter is available at any time in case of emergency.

Embodiment 5

Figure 2:
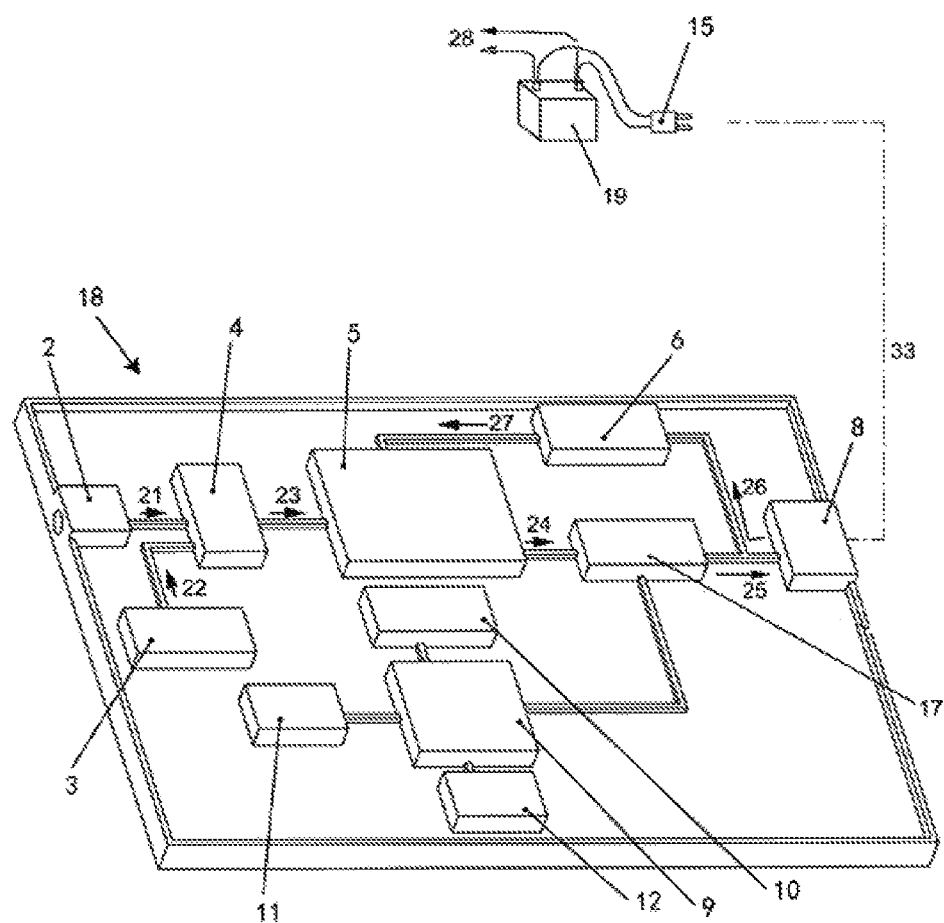
FIG. 2 is an overall schematic diagram of Embodiment 5 of the capacitive car jump starter of the present disclosure.

FIG. 2 is referred to now. Unlike Embodiments 1 to 4, in this embodiment, the capacitive car jump starter is permanently fixed in a compartment of an engine of a motorcar, and a plug 15 to be connected to a storage battery of the motorcar through a connection wire is inserted into an output socket 8 in a frequent and continuous manner (sustainedly and uninterruptedly), and is connected to positive and negative electrodes of a storage battery 19 of the motorcar through the connection wire. The present embodiment differs from Embodiments 1 to 4 further in that a charge and discharge intelligent management circuit 17 as a control and protection device is incorporated in the capacitive car jump starter to replace the discharge protection circuit 7 shown in FIG. 1. The standby power supply device further includes a DC generator that supplies electrical energy to the motorcar while the motorcar is running. When the generator of the motorcar is used to charge the storage battery of the motorcar during running of the motorcar, the storage capacitor of the capacitive car jump starter is also charged, and the storage capacitor of the capacitive car jump starter would not discharge when the motorcar is shut down. When the charge and discharge intelligent management circuit 17 detects that the engine of the motorcar needs to be started but the storage battery of the motorcar per se falls short of electricity (i.e. having a overlow voltage), the capacitive car jump starter automatically turns on the charge and discharge intelligent management circuit 17 and helps the motorcar to start successfully using an output of the output socket 8. This manner is advantageous in that the capacitive car jump starter is always kept to be standby and is maintenance-free. However, an ambient temperature of the compartment of the engine is relatively high, and thus the capacitor used must satisfy the requirements of specification for high temperature resistance. As shown in FIG. 2, the charge and discharge intelligent management circuit 7 is electrically connected to a MCU (micro control unit) intelligent control device 9, and the MCU intelligent control device 9 is in turn electrically connected to the charge and discharge indication device 10, the buzzer 11 and the key circuit 12 respectively. The storage capacitor 5, the charging circuit 6, the MCU intelligent control device 9, the capacity and charge and discharge indication device 10, the buzzer 11, the key circuit 12, and the charge and discharge intelligent management circuit 17 of this embodiment are provided within a cabinet 18 of the capacitive car jump starter.

The meanings of the reference numerals used in the drawings are listed as follows:

1, 18: cabinet;
2: input socket;
3: dry battery box, which for example is capable of accommodating six AA dry batteries, one row of three of which are connected in series is connected in parallel to the other row of three of which are connected in series;
4: charging circuit, e.g., with a specification of 5V DC/2 A;
5: storage capacitor, the so-called supercapacitor, e.g., with a specification of 12V 360F×6;
6: charging circuit, e.g., with a specification of 12V DC/6 A;
7: discharge protection circuit, with a specification of 12V DC/200 A;
8: output socket;
9: MCU intelligent control device;
10: capacity and charge and discharge indication device;
11: buzzer and drive circuit;
12: key circuit;
13: Charge Pal type storage battery, or motorcar DC power source, e.g., with a specification of 5V DC;
14: solar cell panel;
15: plug connected to storage battery of motorcar;
16: plug temporarily connected to storage battery;
16': connector clip temporarily connected to storage battery;
17: charge and discharge intelligent management circuit;
19: storage battery of motorcar;
21, 22, 23, 24, 25, 26, 27: arrows indicating transmission directions of electrical energy;
28: arrow indicating introduction of electrical energy into electric system of motorcar;
31, 32, 33: Dotted dash lines indicating connection.

The invention claimed is:

1. A capacitive car jump starter comprising:
a storage capacitor that is configured to store electrical energy for starting an engine of a motorcar;
a standby power supply device that is configured to input electrical energy to the storage capacitor and comprises a first standby power supply device that includes a storage battery of the motorcar;
a test and indication device that is configured to test and indicate a power storage state of the storage capacitor;
a control and protection device that is configured to control and protect an operation of a connection circuit from overload when the storage capacitor discharges to start the engine of the motorcar and that is located downstream of an output port of the storage capacitor and located upstream of the first standby power supply device; and a reverse charging circuit through which the remaining electrical energy of the first standby power supply device is charged to the storage capacitor and which comprises a first boosting device that is configured to boost a voltage of the first standby power supply device to a voltage required by the storage capacitor and that is provided between a first input port of the storage capacitor and the first standby power supply device, the first boosting device being connected in parallel with the storage capacitor and the control and protection device, wherein the standby power supply device and the control and protection device are configured to be electrically connected to the storage capacitor, and the test and indication device is configured to be electrically connected to the control and protection device, and wherein the first boosting device is configured to be turned off after the storage capacitor is charged to be full so that an entirety of electric currents outputted from the storage capacitor passes through the control and protection device.

2. The capacitive car jump starter of claim 1, wherein the standby power supply device further comprises a second standby power supply device that is one or more selected from:
  a) a hand-held lithium battery;
  b) a dry battery; and
  c) a solar photovoltaic cell panel.

3. The capacitive car jump starter of claim 1, wherein the standby power supply device further comprises a DC generator that supplies electrical energy to the motorcar.

4. The capacitive car jump starter of claim 2, wherein the first and second standby power supply devices are electrically connected to the storage capacitor through a power in and out port, and the power in and out port comprises an input socket connected to the second standby power supply device and an input and output socket connected to the first standby power supply device.

5. The capacitive car jump starter of claim 2, further comprising a second boosting device that is configured to boost a voltage of the second standby power supply device to a voltage desired by the storage capacitor and that is provided between a second input port of the storage capacitor and the second standby power supply device.

6. The capacitive car jump starter of claim 1, wherein the test and indication device comprises a light display device and a sound prompt device.

7. The capacitive car jump starter of claim 1, wherein the control and protection device comprises a discharge protection circuit device or a charge and discharge intelligent management circuit device.

8. The capacitive car jump starter of claim 4, wherein the control and protection device is provided between the output port of the storage capacitor and the input and output socket.

* * * * *